(12) United States Patent
Carpenter et al.

(10) Patent No.: US 11,705,857 B2
(45) Date of Patent: Jul. 18, 2023

(54) WEATHER PROTECTED GEAR MECHANISM FOR TILTABLE SOLAR PANEL ARRAY

(71) Applicant: Spotlight Solar, Inc., Chapel Hill, NC (US)

(72) Inventors: William Bradford Carpenter, Asheville, NC (US); Robert J. Surra, Cary, NC (US)

(73) Assignee: Spotlight Solar, Inc., Chapel Hill, NC (US)

( * ) Notice: Subject to any disclaimer, the term of this patent is extended or adjusted under 35 U.S.C. 154(b) by 345 days.

(21) Appl. No.: 16/852,664

(22) Filed: Apr. 20, 2020

(65) Prior Publication Data

US 2021/0328541 A1 Oct. 21, 2021

(51) Int. Cl.
*H02S 20/32* (2014.01)
*F16H 57/029* (2012.01)
*F24S 40/10* (2018.01)
*F24S 30/425* (2018.01)
*F24S 30/00* (2018.01)
*F16H 57/02* (2012.01)

(52) U.S. Cl.
CPC .......... *H02S 20/32* (2014.12); *F16H 57/029* (2013.01); *F24S 30/425* (2018.05); *F24S 40/10* (2018.05); *F16H 2057/02039* (2013.01); *F24S 2030/134* (2018.05)

(58) Field of Classification Search
CPC .......... H02S 20/32; H02S 20/10; H02S 20/30; F16H 57/029; F16H 2057/02039; F24S 30/425; F24S 40/10; F24S 2030/134; F24S 30/45; Y02E 10/47; Y02E 10/50
See application file for complete search history.

(56) References Cited

U.S. PATENT DOCUMENTS

| | | | | |
|---|---|---|---|---|
| 4,248,332 A | * | 2/1981 | Noyes | F16D 31/04 192/61 |
| 8,981,271 B1 | * | 3/2015 | Risner | F24S 30/452 250/221 |
| 2014/0174499 A1 | * | 6/2014 | Fitzgerald | H02S 20/32 136/246 |

* cited by examiner

*Primary Examiner* — Michael Y Sun
(74) *Attorney, Agent, or Firm* — NK Patent Law

(57) ABSTRACT

Device for securing an orientation of photovoltaic panels includes a stem for supporting an array assembly of photovoltaic panels for producing an electrical current when exposed to sunlight. The array assembly also includes eye blades positioned on a side opposite to a photovoltaic panel carrying side. The device further includes a joint interconnecting the stem and the eye blades of the array assembly. The joint includes a hollow horizontal conduit and a bolting mechanism for adjustably coupling the eye blades to lateral ends of the horizontal conduit. A side of each eye blade facing the horizontal conduit carries an eye blade gear that cooperatively meshes with a conduit gear carried at or near a lateral end of the horizontal conduit to secure the array assembly at a predetermined angle relative to a longitudinal axis passing through the stem.

11 Claims, 14 Drawing Sheets

WEATHER PROTECTED GEAR MECHANISM FOR TILTABLE SOLAR PANEL ARRAY

TECHNICAL FIELD

The present invention relates to solar panel arrays, and specifically, to a system for adjusting and securing the orientation of solar panel arrays.

BACKGROUND

Significant research has been done toward increasing the conversion efficiency of the photovoltaic panels, and the orientation of photovoltaic panels plays an important role in the conversion efficiency. It is known that a perpendicular orientation of the panels to the incident angle of sunlight maximizes the solar irradiation of the panels, thus maximizing the total amount of solar energy converted to electrical energy. A variety of techniques for adjusting the position of the photovoltaic panels exist in the field. Some systems for changing the angle of the photovoltaic panels have the panels arranged in a 2-D matrix of columns and rows. These systems can adjust the panel angle about two axes, and the adjustment about the two axes can be done manually at the installation time.

Gear mechanisms that serve to adjust the orientation of photovoltaic panel systems can get corroded or otherwise get deteriorated due to exposure to natural elements. This problem can be aggravated in photovoltaic panel systems installed at locations susceptible to high wind forces and high level of corrosive salts such as, for example, coastline areas, as well those installed at locations susceptible to high level of dust accumulation such as, for example, windy, dry and desert areas.

Accordingly, opportunities exist for improved methods and devices for prolonging the life of gear mechanisms that serve to adjust and secure the orientation of photovoltaic panels.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Embodiments according to the invention can provide methods, devices, systems, and compositions for securing orientation of photovoltaic panels.

According to one or more embodiments, a device for securing an orientation of photovoltaic panels comprises a stem for supporting an array assembly of photovoltaic panels for producing an electrical current when exposed to sunlight, the array assembly further comprising eye blades positioned on a side opposite to a photovoltaic panel carrying side; and, a joint interconnecting the stem and the eye blades of the array assembly. The joint includes a hollow horizontal conduit and a bolting mechanism for adjustably coupling the eye blades to lateral ends of the horizontal conduit. A side of each eye blade facing the horizontal conduit carries an eye blade gear that cooperatively meshes with a conduit gear carried at or near a lateral end of the horizontal conduit to secure the array assembly at a predetermined angle relative to a longitudinal axis passing through the stem.

According to one or more embodiments, the joint further comprises a vertical conduit coupled to the horizontal conduit, wherein the vertical conduit carries a plate gear for cooperatively meshing with a stem gear carried at an upper portion of the stem.

According to one or more embodiments, a bottom portion of the vertical conduit circumferentially extends over a top portion of the stem.

According to one or more embodiments, the device further comprises a second bolt mechanism for securing the stem to the joint at a predetermined orientation of a major plane of the array assembly about the longitudinal axis passing through the stem.

According to one or more embodiments, the second bolt mechanism intersects one or more of the plate gear and the stem gear at a substantial right angle.

According to one or more embodiments, the eye blade further comprises a tube guide for sliding over an end of the horizontal conduit, the tube guide extending circumferentially over at least part of the lateral end of the horizontal conduit.

According to one or more embodiments, teeth of the conduit gear are positioned along an internal circumference of the conduit gear.

According to one or more embodiments, teeth of the conduit gear are positioned along an external circumference of the conduit gear.

According to one or more embodiments, the conduit gear comprises a gear formed on a plate, wherein the plate is attached to a lateral end of the horizontal conduit.

According to one or more embodiments, the plate is welded to the lateral end of the horizontal conduit.

According to one or more embodiments, the eye blade gear is welded or bolted to the eye blade.

According to one or more embodiments, the horizontal conduit further comprises access ports for accessing an interior of the horizontal conduit.

According to one or more embodiments, a device for securing an orientation of photovoltaic panels comprises a stem for supporting an array assembly of photovoltaic panels for producing an electrical current when exposed to sunlight, the array assembly further comprising array blades positioned on a side opposite to a photovoltaic panel carrying side, each array blade carrying an array blade gear with teeth extending into an opening defined in the array blade; and, a joint interconnecting the stem and the array blades of the array assembly. The joint includes a hollow horizontal conduit and a bolting mechanism for adjustably coupling the array blades to lateral ends of the horizontal conduit, the horizontal conduit carrying a conduit gear at or near each lateral end of the horizontal conduit. A pair of joint caps secure the opening of the array blades. A horizontal conduit facing side of each joint cap defines a cap gear for cooperatively meshing with the array blade gear and the conduit gear. The caps gear fits within, and cooperatively couples with, the array blade gear and the conduit gear to secure the array assembly at a predetermined pivot angle relative to a longitudinal axis passing through the stem.

According to one or more embodiments, the joint further comprises a vertical conduit coupled to the horizontal conduit, wherein the vertical conduit carries a plate gear for cooperatively meshing with a stem gear carried at an upper portion of the stem.

According to one or more embodiments, two bolting mechanisms pass through two bolt openings defined on each joint cap, wherein the bolt openings are positioned diagonally across from each other on the joint cap.

According to one or more embodiments, the device further comprises a weather seal provided at the interface between the joint cap and the opening of the array blade.

According to one or more embodiments, a device for securing an orientation of photovoltaic panels comprises a stem for supporting an array assembly of photovoltaic panels for producing an electrical current when exposed to sunlight, the array assembly further comprising array blades positioned on a side opposite to a photovoltaic panel carrying side, each array blade defining a plurality of array blade holes uniformly arranged in a circle; and, a joint interconnecting the stem and the array blades of the array assembly. The joint includes a hollow horizontal conduit with a vertical plate coupled to lateral ends of the horizontal conduit. The vertical plate comprises a plurality of vertical plate openings arranged in a circle. A pair of joint caps secures the array blades to the joint. Each joint cap defines a plurality of joint cap openings arranged in a circle. Each joint cap opening configured for receiving a bolting mechanism for adjustably coupling the array blades to the vertical plate of the joint. The bolting mechanism passes through a joint cap opening, a corresponding array blade hole, and a corresponding vertical plate opening to secure the array assembly at a predetermined pivot angle relative to a longitudinal axis passing through the stem.

According to one or more embodiments, the joint further comprises a horizontal plate carried within, and fixedly attached to, the hollow horizontal conduit, the horizontal plate comprising a plurality of horizontal plate openings arranged in a circle, each horizontal plate opening configured for receiving a vertical bolting mechanism for adjustably coupling the horizontal plate to a stem plate provided at an upper portion of the stem, the stem plate comprising a plurality of stem plate openings arranged in a circle, wherein each bolting mechanism passes through a horizontal plate opening and a corresponding stem plate opening to secure the joint to the stem.

According to one or more embodiments, the plurality of joint cap openings total 12 or a multiple of 12.

According to one or more embodiments, the device further comprises a weather seal provided at the interface between the joint cap and the array blade.

BRIEF DESCRIPTION OF THE DRAWINGS

The foregoing, as well as the following Detailed Description, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DESCRIPTION OF EMBODIMENTS ACCORDING TO THE INVENTION

Figure 1A:
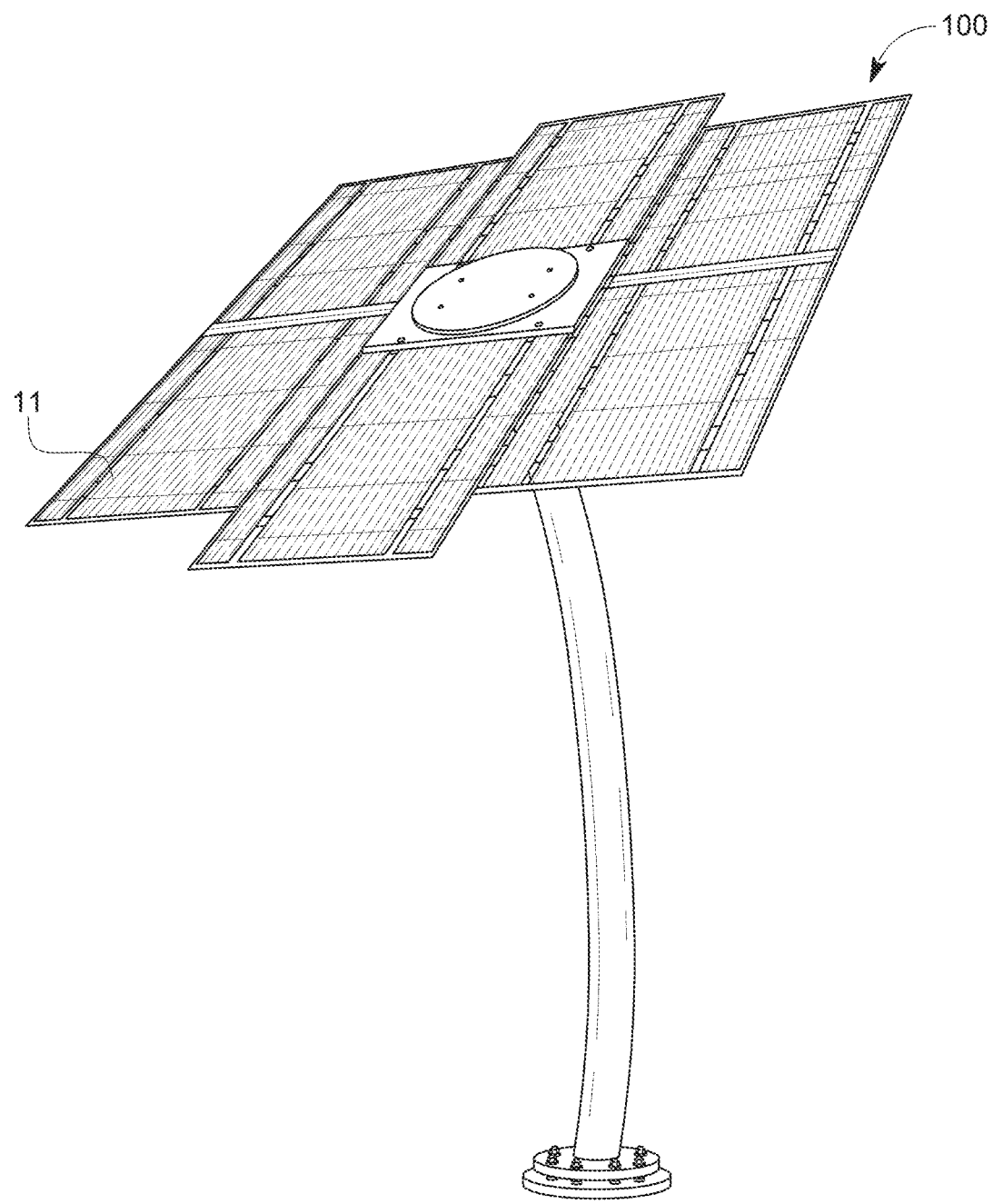
FIG. 1A illustrates a perspective view of a solar array system, according to one or more embodiments of the presently disclosed subject matter.

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As will be described in greater detail below with reference to the figures, the subject matter described herein provides for methods, devices and systems for securing orientation of photovoltaic panels in manner which operates to prolong the life of gear mechanisms that serve to adjust the orientation of photovoltaic panels.

As noted earlier, gear mechanisms that serve to adjust the orientation of photovoltaic panel systems can get corroded or otherwise get deteriorated due to exposure to natural elements. Embodiments of the presently disclosed subject matter operate to advantageously prolong the life of gear mechanisms that serve to adjust the orientation of photovoltaic panels by shielding various movable parts such as gear mechanisms from exposure to elements of nature. Embodiments of the presently disclosed subject matter can accordingly operate to improve performance of solar assembly systems installed in corrosive environments and in tough climatic environments by mitigating the effect of corrosion on vulnerable components of such solar assembly systems. Embodiments of the presently disclosed subject matter can further operate to: reduce the number of parts; improve installer efficiency; simplify installation labor steps, improve adjustment features; and, reduce reliance on operator and technician skill levels during assembly, in addition to other benefits that will be apparent to a person of skill in the art. Embodiments of the presently disclosed subject matter can advantageously provide robust structural performance to allow use of the solar array system as disclosed herein in locations with very high wind loads.

Figure 1B:
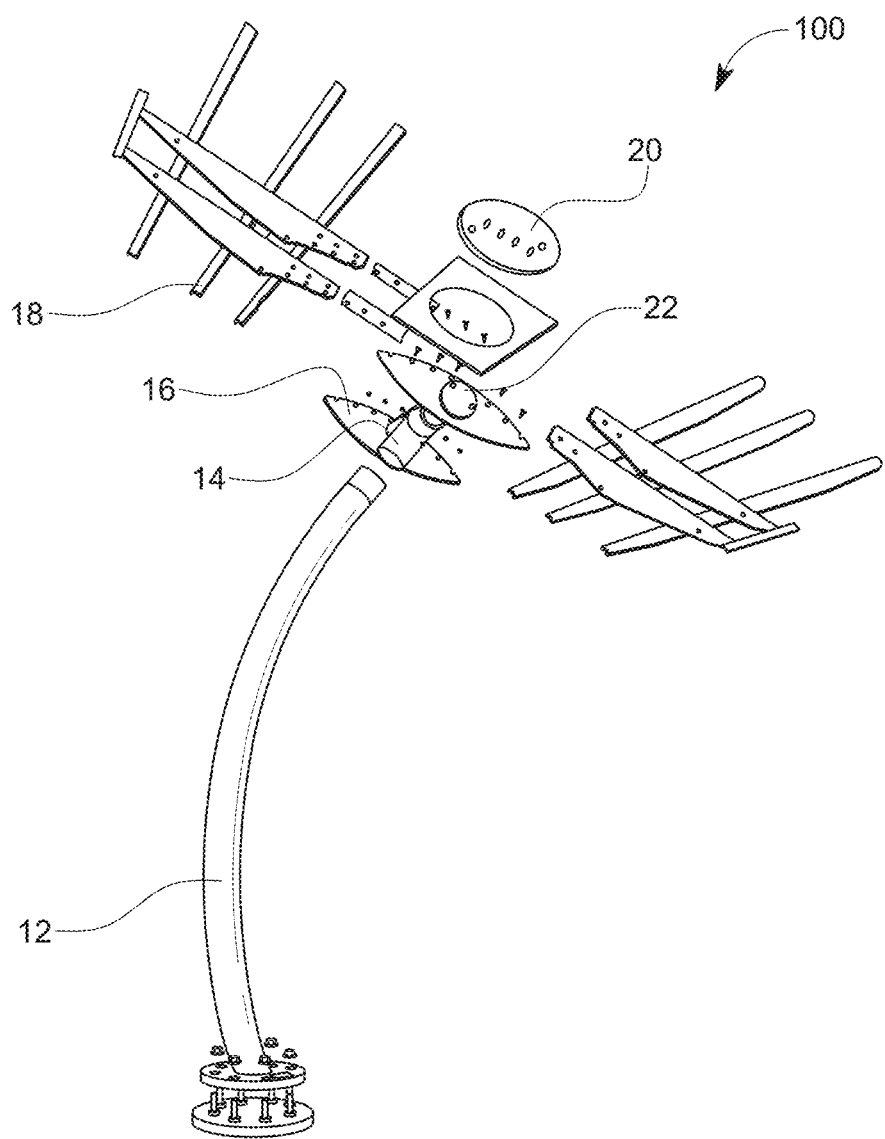
FIG. 1B illustrates a blown-up perspective view of a solar array system, according to one or more embodiments of the presently disclosed subject matter.
Figure 2:
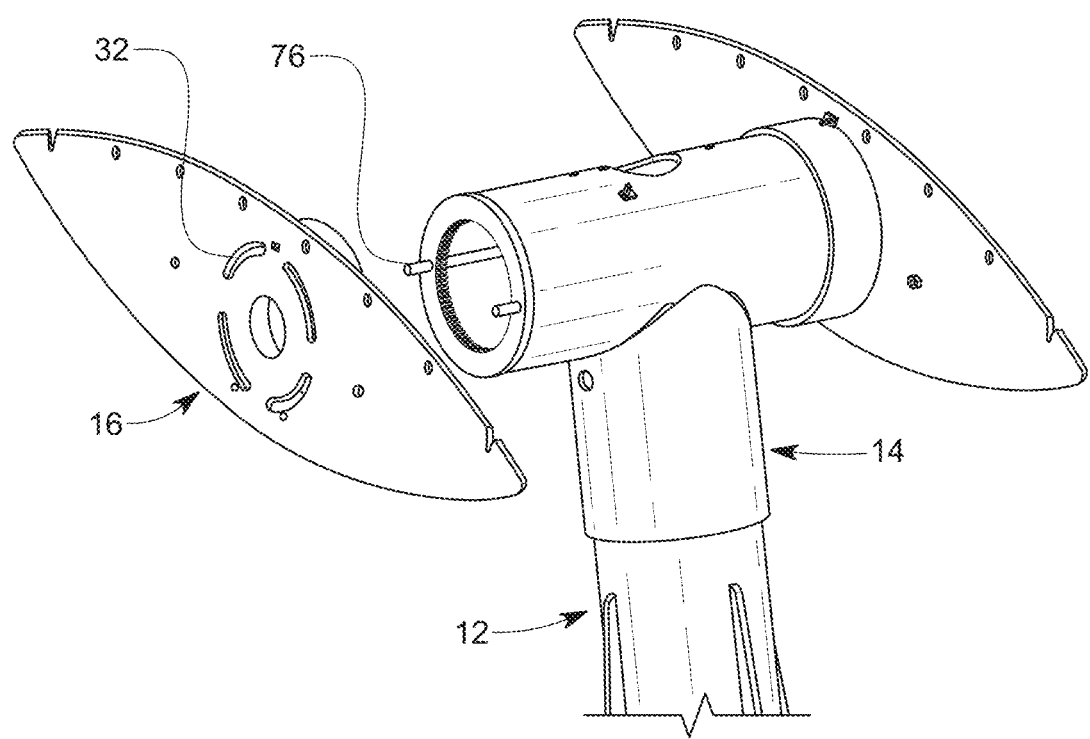
FIG. 2 illustrates a side perspective view of a portion of the solar array system, according to one or more embodiments of the presently disclosed subject matter.
Figure 3A:
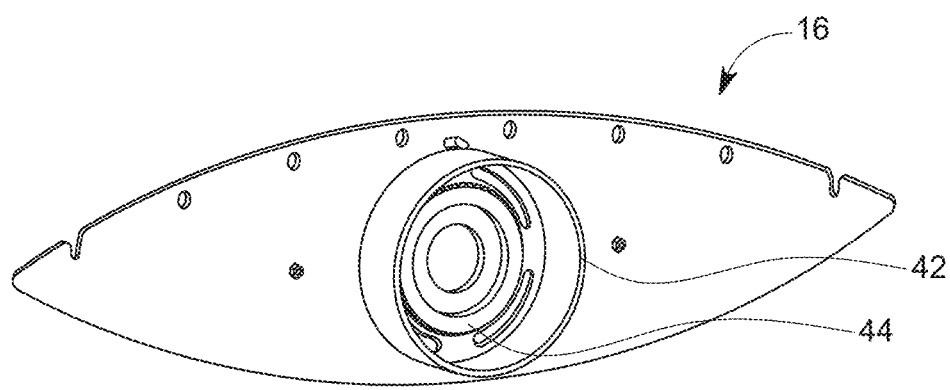
FIG. 3A illustrates a perspective view of an eye blade.
Figure 3B:
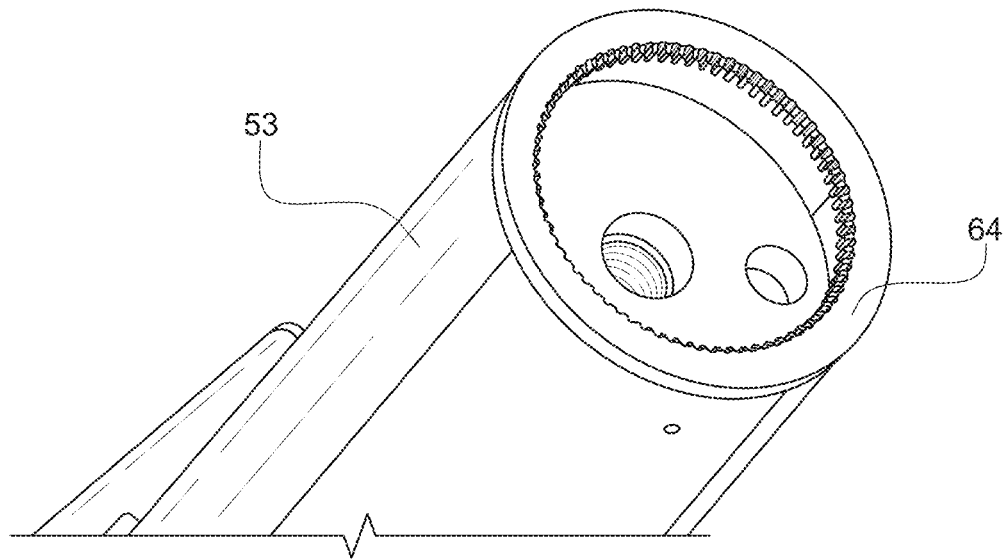
FIG. 3B illustrates a perspective view of a portion of a joint; and, FIG. 3C illustrates a perspective view of the joint, according to one or more embodiments of the presently disclosed subject matter.
Figure 3C:
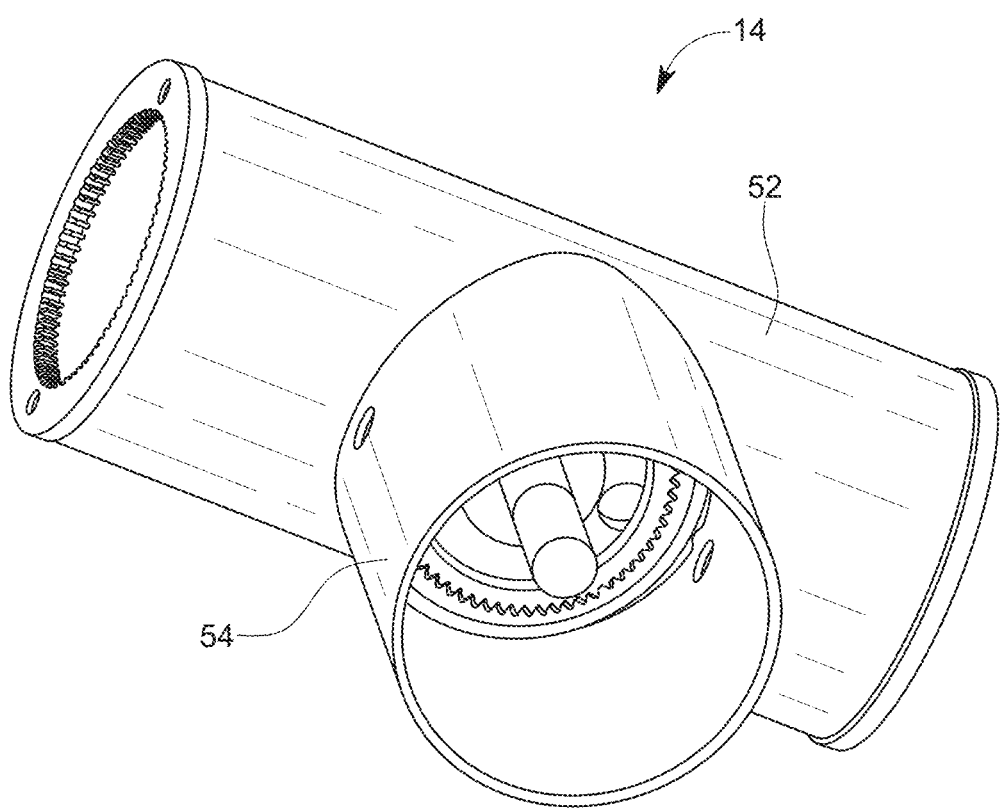
Figure 4:
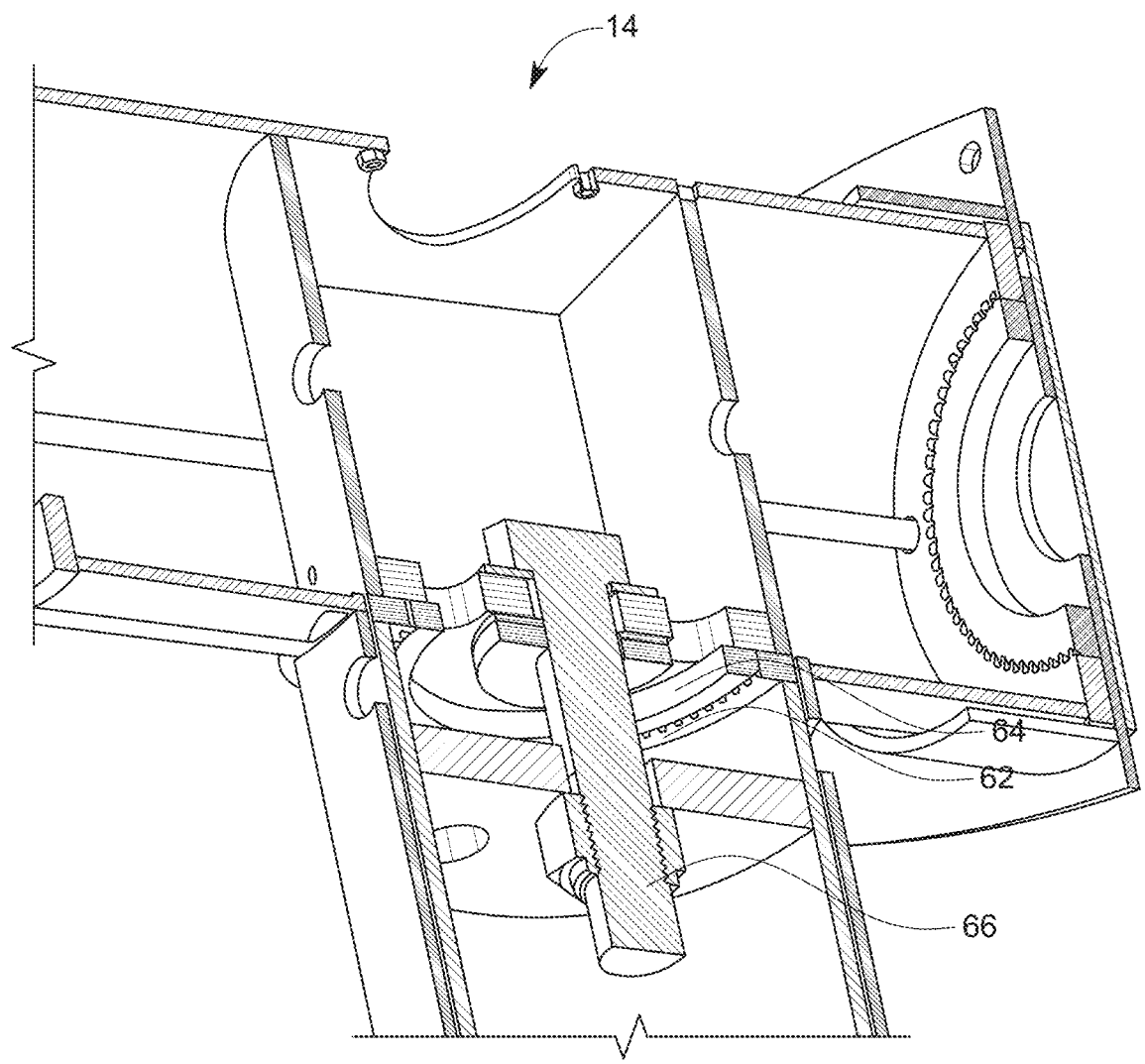
FIG. 4 illustrates a perspective view of a cross-section of a portion of a solar array system, according to one or more embodiments of the presently disclosed subject matter.
Figure 5:
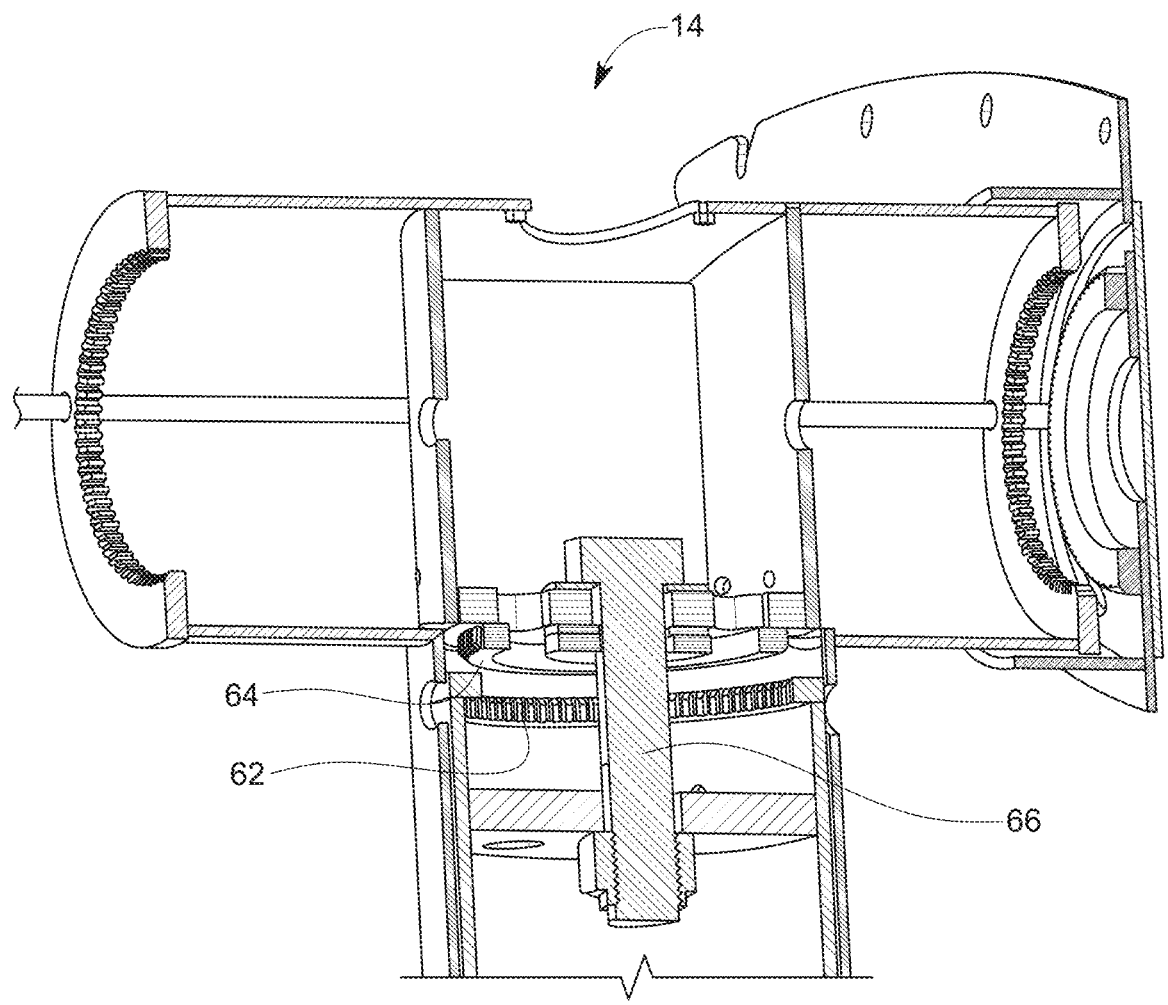
FIG. 5 illustrates a perspective view of a cross-section of a portion of a solar array system in a disengaged state, according to one or more embodiments of the presently disclosed subject matter.

Referring to the figures in general, various embodiments of a device for securing an orientation of photovoltaic panels are provided. In at least one embodiment, as illustrated in FIG. 1A through FIG. 5, for example, solar array system 100 includes stem 12, joint 14 and array assembly 18. FIG. Array assembly 18 can be provided with an array disk assembly 20 for signage or aesthetics purposes. Solar array system 100 advantageously operates to secure an orientation of photovoltaic panels 11. Stem 12 operates to support array assembly 18 that includes photovoltaic panels 11. Photovoltaic panels 11 operate to produce electrical current when exposed to sunlight. Photovoltaic panels 11 is provided with appropriate wirings and circuits to accomplish the production of electric current, and the subsequent storage and/or distribution of the produced electric current, as will be readily understood by a person of skill in the art. Array assembly 18 further comprises eye blades 16 positioned on a side of the array assembly that is opposite to the side that carries photovoltaic panels 11. In various embodiments, eye blades 16 represent lenticular shaped plates. Joint 14 interconnects stem 12 and eye blades 16 of array assembly 18. Joint 14 can include a hollow horizontal conduit 52 that may have a cylindrical outer shape in one embodiment. In other embodiments, the cylindrical shape can be replaced with any other suitable shape without deviating from the spirit of the invention as disclosed herein. According to one or more embodiments, joint 14 further comprises vertical conduit 54 coupled to horizontal conduit 52. The vertical conduit 54 carries a plate gear such as plate gear 62 for cooperatively meshing with stem gear 64 carried at an upper portion of stem 12. As illustrated in FIG. 3B, in some embodiments, the upper portion of stem 12 includes a cap portion such as stem cap 53 that houses stem gear 64. In various embodiments, stem cap 53 can form an integral constituent part of stem 12. In various embodiments, joint 14 can fit over stem cap 53 such that plate gear 62 cooperatively meshes with stem gear 64 carried at an upper portion of stem cap 53, and thereby at an upper portion of stem 12. In some embodiments, a bottom portion of the vertical conduit of joint 14 circumferentially extends over a top portion of stem cap 53, wherein stem cap 53 forms the top portion of stem 12. Solar array system 100 further includes a pair of joint caps 22 securing the openings of the eye blades 16. FIG. 1B illustrates the stem 12 having a curve structure whereas FIG. 2 illustrates stem 12 having a non-curve structure. As a comparison of FIG. 1B and FIG. 2 illustrates, the manner in which joint 14 interconnects with stem 12 differs depending on whether the stem 12 has a curve structure or a non-curve structure. It is to be noted that various features of array assembly 18 and of joint 14 are interchangeable between a solar array system including a stem 12 with a curve structure (as illustrated, for e.g., in FIGS. 1A and 1B), and a solar array system including a stem 12 with a non-curve structure (as illustrated, for e.g., in FIG. 2). For example, the mechanics of the gears provided at the end of stem 12 is interchangeable between a curve structure and a non-curve structure. FIG. 3A illustrates a perspective view of an eye blade provided at an end of a non-curve structure; the top end of stem 12 (of a curve structure and of a non-curve structure) can share same or similar features as the eye blade illustrated in FIG. 3A. FIG. 4 shows a portion of the solar array system illustrating a joint mating to the eye blade and the stem. FIG. 5 illustrates a perspective view of a cross-section of a portion of a solar array system in a disengaged state.

Through bolt mechanism 76 operates to adjustably couple eye blades 16 to lateral ends of the horizontal conduit. A side of each eye blade 16 facing horizontal conduit 52 carries an eye blade gear 44 that cooperatively meshes with a conduit gear 46 carried at or near a lateral end of horizontal conduit 52 to secure array assembly 18 at a predetermined angle relative to a longitudinal axis passing through stem 12. Such a layout can advantageously operate to protect eye blade gear 44 and conduit gear 46 as well as areas contiguous to eye blade gear 44 and conduit gear 46 from the corrosive impact of salt, dust and/or dirt laden winds that the solar array system can encounter during its course of operations. Eye blade 16 can further include tube guide 42 for sliding over an end of horizontal conduit 52. Tube guide 42 extends circumferentially over at least part of the lateral end of horizontal conduit 52. Such a layout operates to further improve the protection of eye blade gear 44 and conduit gear 46 and areas contiguous to eye blade gear 44 and conduit gear 46 from the corrosive impact of salt, dust and/or dirt laden winds that the solar array system may encounter. Slots 32 are provided for assisting in the installation of the array assembly in general, and photovoltaic panels 11 in particular, at a predetermined angle relative to a longitudinal axis passing through stem 12. The person installing the solar array system can use the slots to access an interior of the horizontal conduit 52. Accordingly, in various embodiments the horizontal conduit can comprise access ports for accessing an interior of the horizontal conduit. In some embodiments, vertical conduit 54 too can be provided with similar slots for accessing an interior of vertical conduit 54.

During installation of the array assembly, after determining an ideal angle relative to a longitudinal axis passing through stem 12 that the photovoltaic panels needs to make for best results, eye blade gear 44 is moved towards conduit gear 46 at a predetermined angle and the teeth of eye blade gear 44 is made to cooperatively mesh with the teeth of conduit gear 46 of horizontal conduit 52 to secure array assembly 18 at the predetermined angle relative to a longitudinal axis passing through stem 12. One or more through bolt mechanisms 76 are then used to lock array assembly 18 at the predetermined angle by tightening the through bolt mechanisms 76 to thereby pull and lock each eye blade gear 44 securely with a corresponding conduit gear 46. In some embodiments, a maximum deviation of 0.75-degrees may be permitted in term of tilting of the array assembly 18 relative to the stem once the through bolt mechanisms 76 have been fully tightened and secured thereby.

In some embodiments, an angle of 40-degrees may be formed between the array assembly and a longitudinal axis passing through the foot of the stem after the through bolt mechanisms 76 have been fully tightened and secured thereby. In some embodiments, a range of 0-degrees and 55.5-degrees may be allowed between the array assembly and a longitudinal axis passing through the foot of the stem. However, all other relevant angles are contemplated by the subject matter of the presently disclosed subject matter.

Joint 14 includes vertical conduit 54 coupled to horizontal conduit 52. In at least one embodiment, vertical conduit 54 carries plate gear 62 for cooperatively meshing with stem gear 64 carried at an upper portion of the stem. It should be noted that while only plate gear 62 has been labeled herein as a "plate" gear, all gears as illustrated and/or mentioned herein can be of plate gear form in at least one embodiment. In some embodiments, one or more of the gears can also be in segments; for example, in one embodiment, three separate gear segments can be used instead of a single complete gear. As a person of skill in the art readily understands, a plate gear is a gear having a solid web of material between the hub and rim. In another embodiment, one or more gears mentioned herein can be formed by laser cutting or by machining. In a further embodiment, few gears mentioned herein can be in the form of plate gears, and a few gears may be formed by laser cutting. Accordingly, in some embodiments, the conduit gear comprises a gear formed on a plate (i.e., a plate gear), with the conduit gear in the form of a plate gear being attached to a lateral end of the horizontal conduit. According to one or more embodiments, the plate gear can be welded to the lateral end of the horizontal conduit. In one embodiment, a 0.125 inch sealing weld may be provided, even though other welding parameters can be used based on the application at hand. According to one or more embodiments, the eye blade gear too can be a plate gear that is welded or bolted to the eye blade. In some embodiments, the gears as illustrated and/or mentioned herein may be formed of a corrosion resistant metal. In various embodiments, the gears can comprise one or more of aluminum, bronze, brass and/or stainless steel. This can advantageously eliminate the need to paint the gears.

In various embodiments, a bottom portion of the vertical conduit circumferentially extends over a top portion of stem 12; such a layout can advantageously operate to protect plate gear 62 and stem gear 64 and the areas contiguous to plate gear 62 and stem gear 64 from the corrosive impact of salt-laden, dust laden, or dirt laden winds that the solar array system can encounter. The solar array system can further comprise one or more second bolt mechanisms 66 for securing stem 12 to joint 14 at a predetermined orientation of a major plane of the array assembly about the longitudinal axis passing through stem 12. In various embodiments, each second bolt mechanism 66 intersects one or more of the plate gear and the stem gear at a substantial right angle. In one embodiment, second bolt mechanism(s) 66 may be fixedly attached to the stem gear; in another embodiment, second bolt mechanism(s) 66 may be fixedly attached to the plate gear.

The array assembly is rotatable 360 degrees relative to the stem due to the presence of plate gear 62 and stem gear 64; for example, in one embodiment, plate gear 62 is fixedly secured to joint 14 while stem gear 64 is fixedly secured to stem 12. In one embodiment, stem 12 can include a stem arm fixedly attached at the upper end of stem 12, wherein stem gear 64 is fixedly secured to the stem arm of stem 12.

During installation, after determining the orientation of a major plane of array assembly 18 about the longitudinal axis passing through stem 12 that the photovoltaic panels are to be installed, plate gear 62 is moved towards stem gear 64 at the selected orientation, and the teeth of plate gear 62 are made to cooperatively mesh with the teeth of stem gear 64 of stem 12 to secure array assembly 18 (and by extension, photovoltaic panels 11) at a predetermined orientation about a longitudinal axis passing through stem 12. In some embodiments, stem gear 64 is carried by stem cap 53 that forms the upper part of stem 12. Second bolt mechanism 66 is then used to lock array assembly 18 at the predetermined orientation by tightening second bolt mechanism 66 to pull and lock plate gear 62 securely with stem gear 64.

Figure 9A:
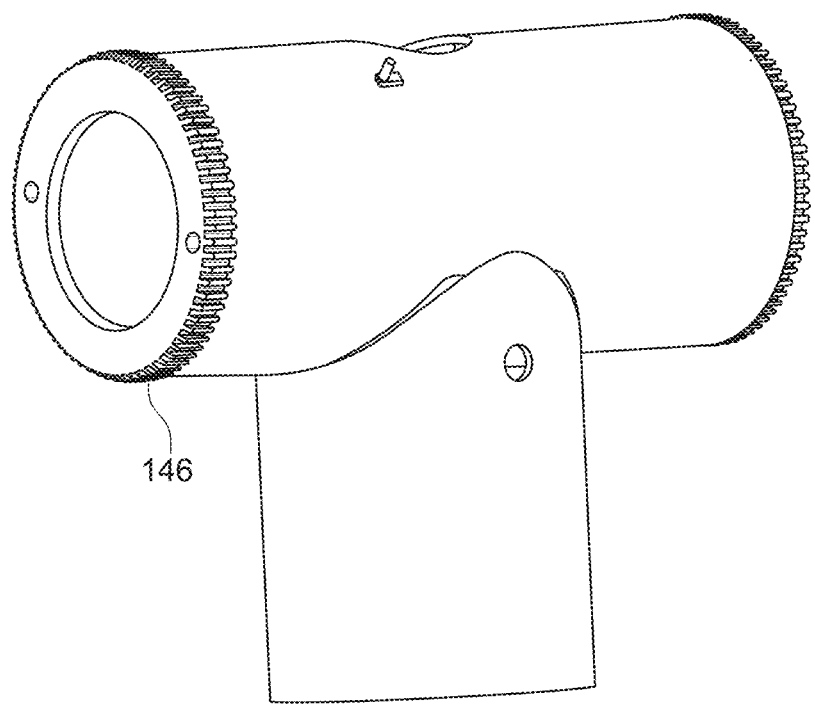
FIG. 9A illustrates a perspective view of a joint; and, FIG. 9B illustrates a perspective view of a portion of a solar array system that includes an inverse plate gear arrangement, according to one or more embodiments of the presently disclosed subject matter.
Figure 9B:
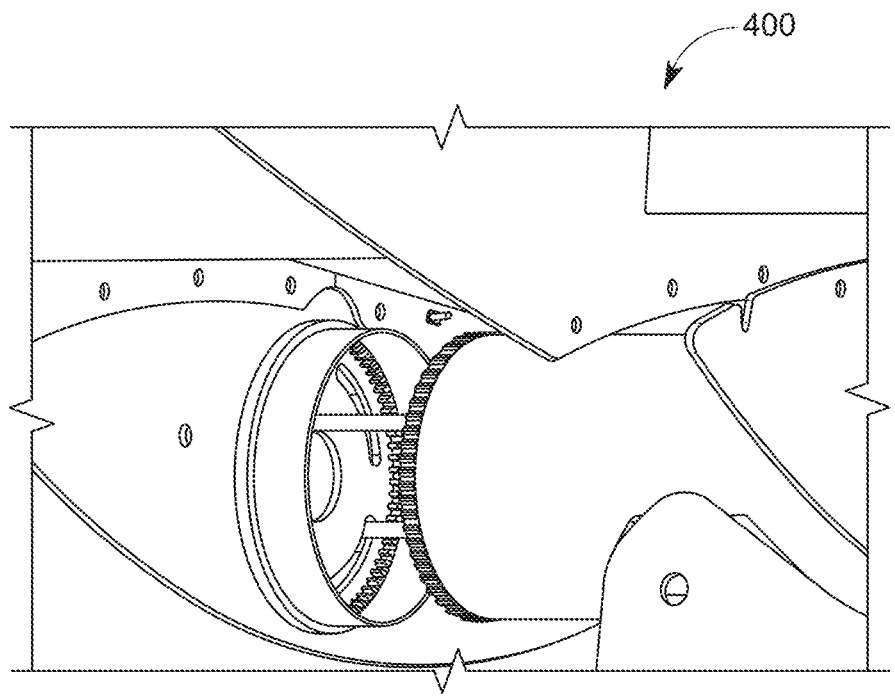

As illustrated in FIG. 3B, for example, teeth of the conduit gear can be positioned along an internal circumference of the conduit gear in one embodiment. Alternately, as illustrated in FIGS. 9A and 9B, for example, teeth of the conduit gear can be positioned along an external circumference of the conduit gear in one embodiment.

Figure 6:
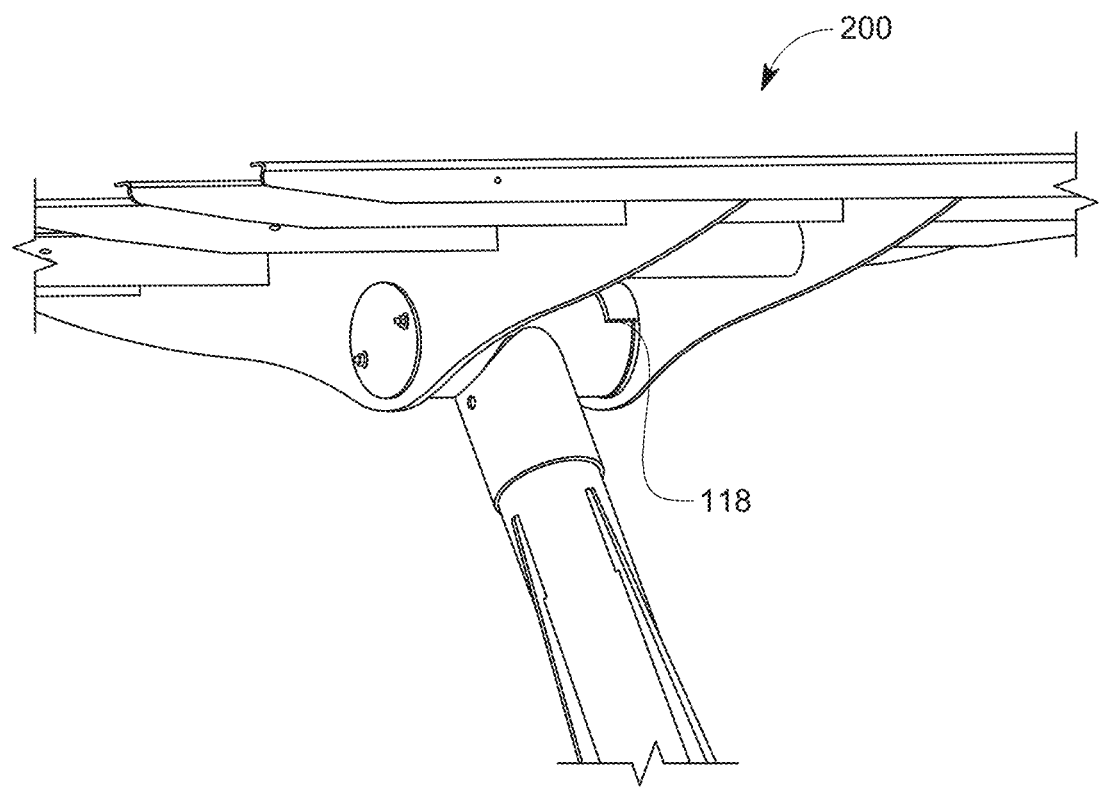
FIG. 6 illustrates a perspective view of a portion of a solar array system, according to one or more embodiments of the presently disclosed subject matter.
Figure 7A:
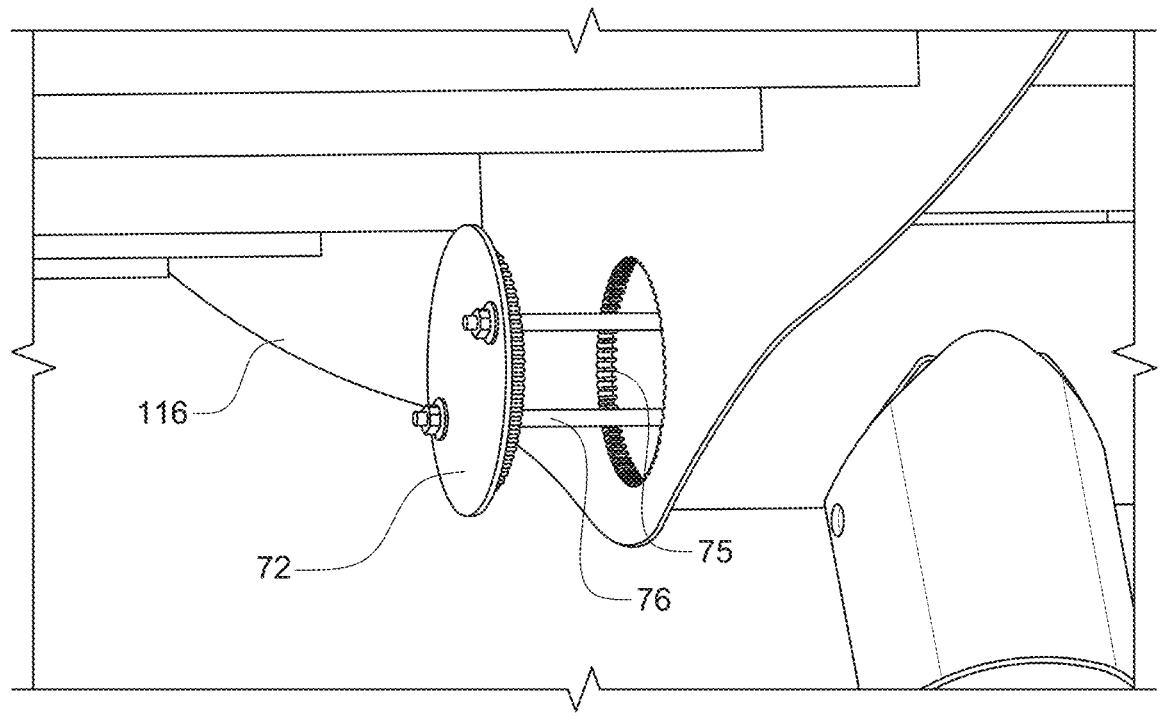
FIG. 7A illustrates a perspective view of a portion of a solar array system.
Figure 7B:
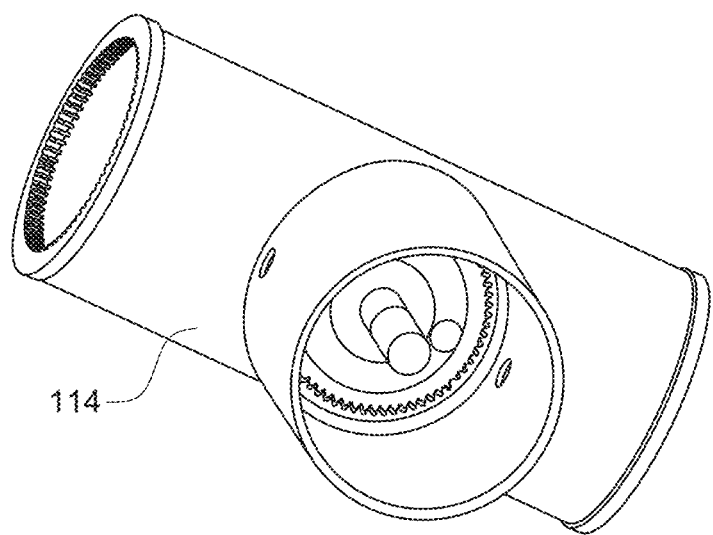
FIG. 7B illustrates a perspective view of a joint; and, FIG. 7C illustrates a perspective view of a portion of a solar array system, according to one or more embodiments of the presently disclosed subject matter.
Figure 7C:
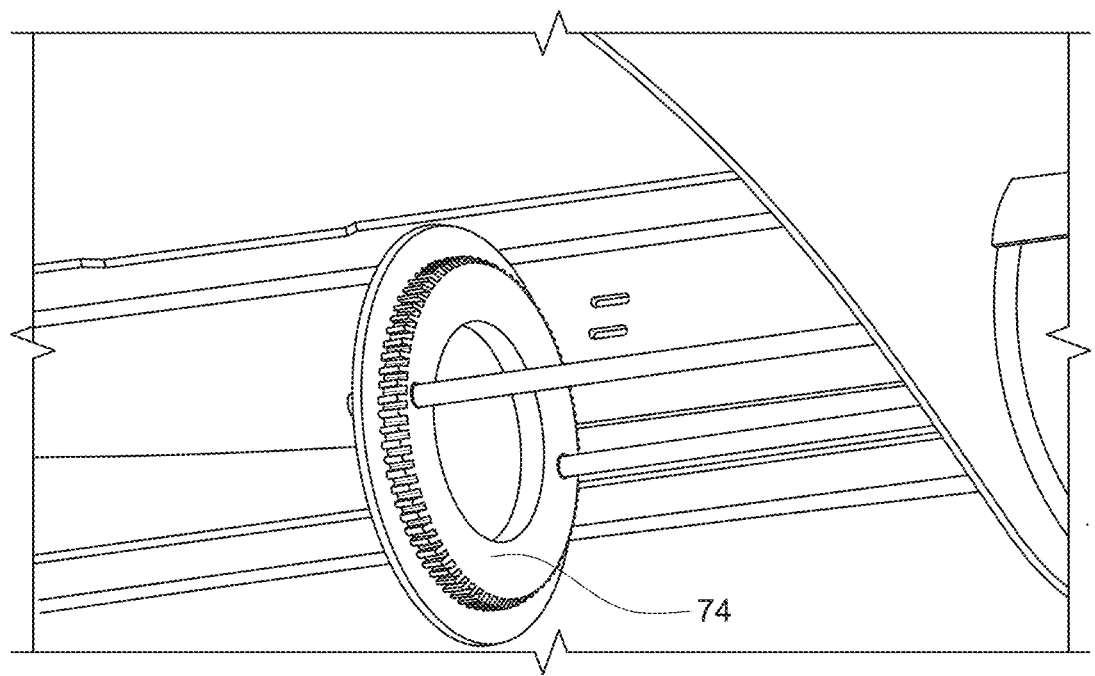

Referring to FIGS. 6 and 7, according to one or more embodiments, solar array system 200 configured for securing an orientation of photovoltaic panels can comprise an array assembly array that includes array blades 116 positioned on a side opposite to a photovoltaic panel carrying side. Each array blade carries an array blade gear 75 with teeth extending into an opening defined in the array blade. In one embodiment, the teeth is cut directly into the array blade wherein the array blade gear forms an integral constituent part of array blade; in such an embodiment, an opening of array blade is provided with teeth extending into the opening as illustrated, for example, in FIG. 7A. Solar array system 200 may otherwise share similar features with solar array system 100. For example, in one embodiment, Joint 114 of solar array system 200 interconnects the stem and the array blades 116 of the array assembly. Joint 114 includes a hollow horizontal conduit with through bolt mechanism 76 operating to adjustably couple the array blades 116 to lateral ends of the horizontal conduit of joint 114. The horizontal conduit carries a conduit gear at or near each lateral end of the horizontal conduit. A pair of joint caps 72 secure the opening of the array blades. A horizontal conduit facing side of each joint cap 72 defines a cap gear 74 for cooperatively meshing with array blade gear 75 and the conduit gear. Each cap gear 74 fits within, and cooperatively couples with, the array blade gear 75 and the conduit gear to secure the array assembly at a predetermined pivot angle relative to a longitudinal axis passing through the stem. In one embodiment, the cap gear 74 can be held in place relative to joint cap 72 by one or more bolting mechanisms; in another embodiment, the cap gear 74 can be held in place relative to joint cap 72 by being welded in place.

According to one or more embodiments, as illustrated, for example, in FIG. 7A, one or more through bolt mechanisms 76 pass through corresponding bolt openings defined on each joint cap 72. In one embodiment, pairs of bolt openings can be positioned directly across from each other on joint cap 72. In various embodiments, a weather seal is provided at the interface between the joint cap 72 and the opening of the array blade 116. Similarly, in various embodiments, a weather seal can also be provided at the interface between the vertical conduit and the stem of solar array system 200; alternately in various embodiments, a weather seal can also be provided at the interface between the plate gear and the stem gear of solar array system 200. Solar array system 200 further includes curved alignment shelf 118. Curved alignment shelf 118 represents a feature that is concentric to the horizontal tube of the joint 114 that aligns the array blade gear 75 and with the teeth inscribed in 116 so the array can be oriented to desired angle during installation and to aid in inserting the locking cap gear 74. This is similar in nature to the tube guide function provided in solar array system 100.

Referring to FIGS. 8A through 8F, according to one or more embodiments, solar array system 300 configured securing an orientation of photovoltaic panels can comprise an array assembly includes array blades 216 positioned on a side opposite to a photovoltaic panel carrying side. Each array blade 216 defines a plurality of array blade openings 84 uniformly arranged in a circle. Solar array system 300 may share similar features with solar array system 100. For example, joint 214 interconnects the stem and the array blades 216 of the array assembly. The joint can include a hollow horizontal conduit. A pair of joint caps 172 can operate to secure the array blades 216 to the joint 214. Each joint cap 172 can define a plurality of joint cap openings 82 arranged in a circle. Each joint cap opening 82 is configured for receiving a bolting mechanism for adjustably coupling the array blades 216 to joint 214. The bolting mechanism passes through a joint cap opening 82, a corresponding array blade opening 84, and a corresponding vertical plate opening 89 provided on joint cap 172 to secure the array assembly at a predetermined pivot angle relative to a longitudinal axis passing through the stem. For alignment purposes, a tapered tube can be provided at the center of joint cap 172.

Figure 8A:
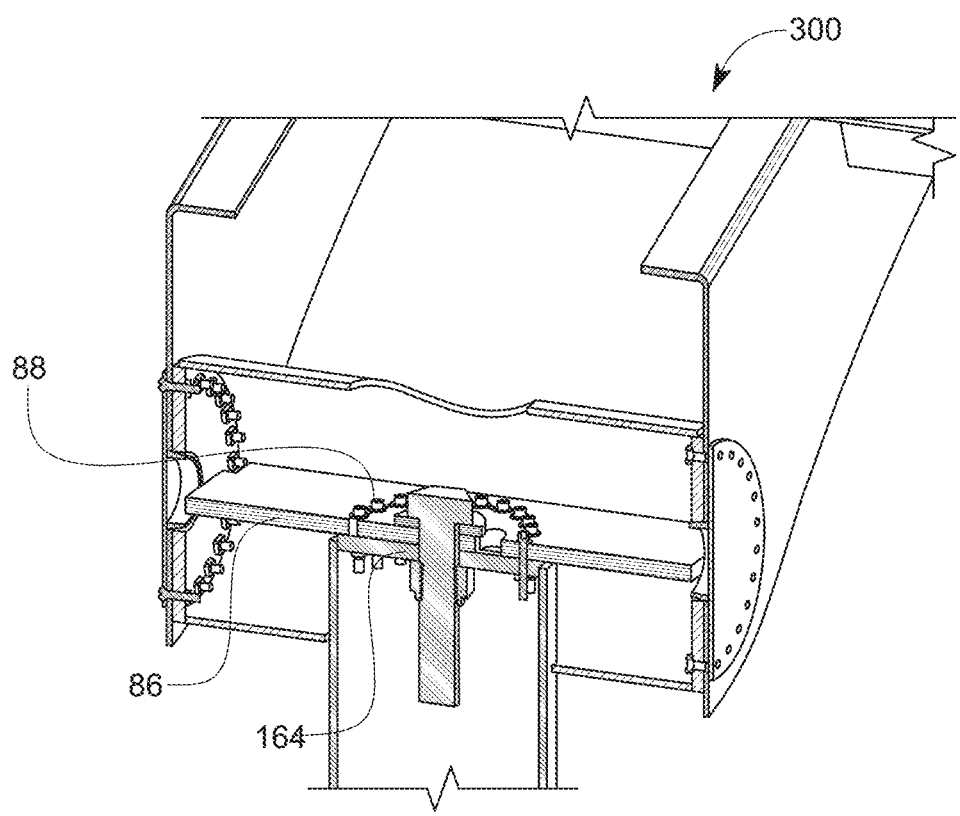
FIG. 8A illustrates a perspective view of a cross-section of a portion of a solar array system.
Figure 8B:
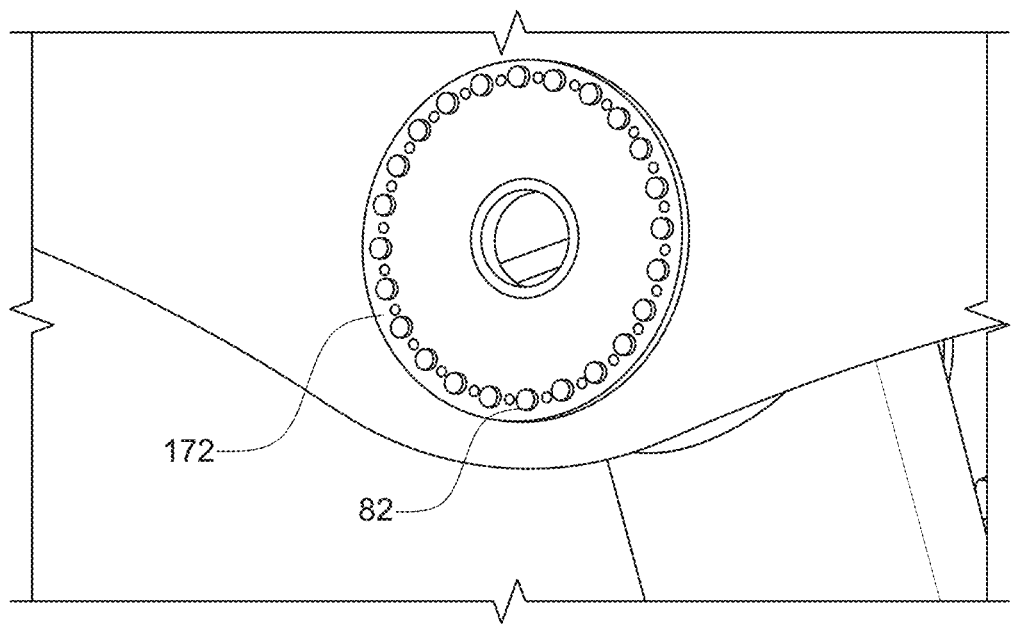
FIG. 8B illustrates a side perspective view of a portion of a solar array system.
Figure 8C:
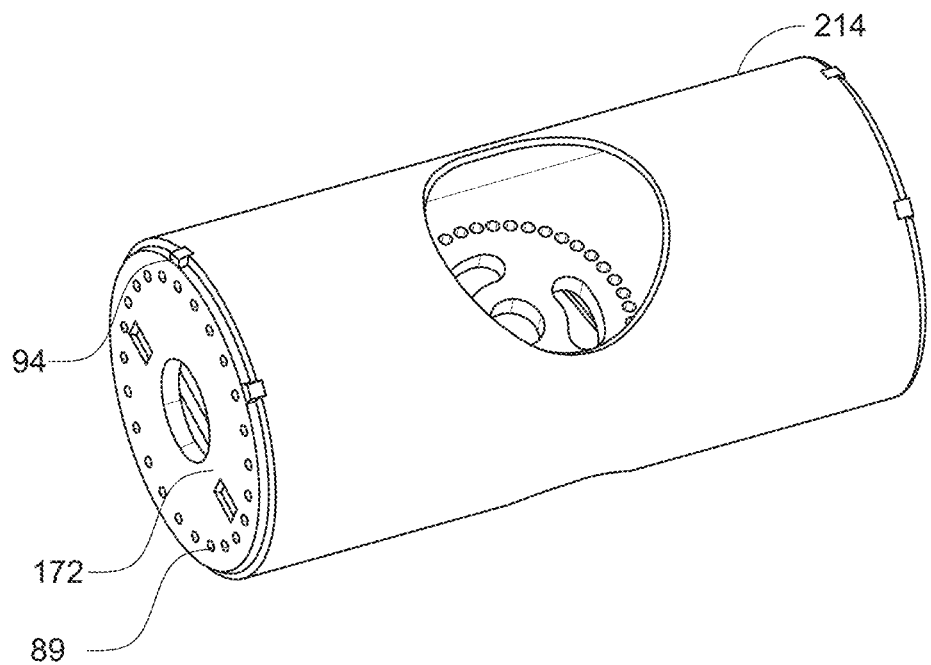
FIG. 8C illustrates a perspective view of a joint.
Figure 8D:
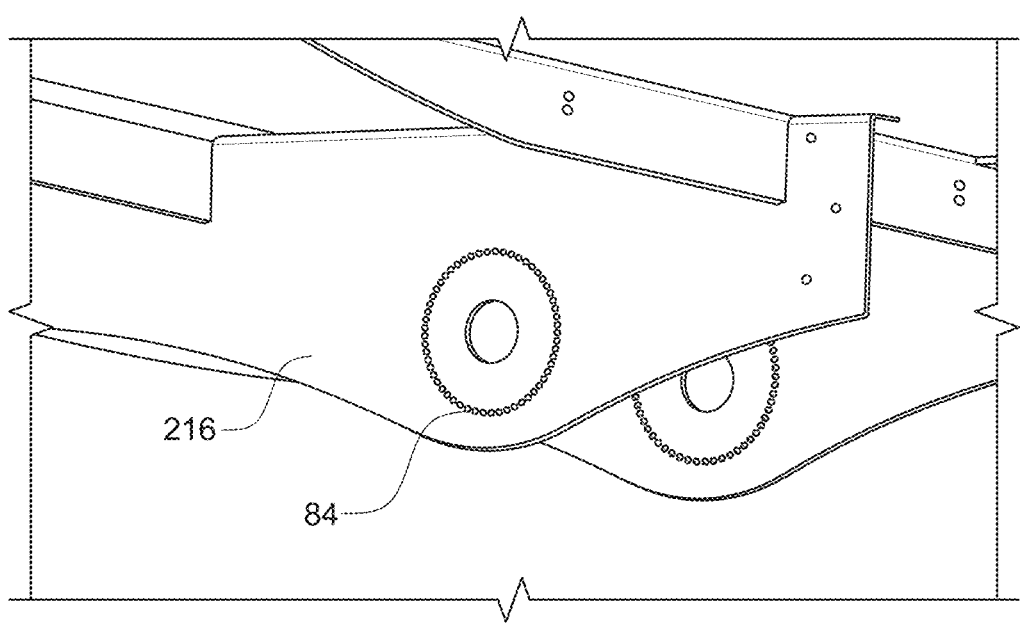
FIG. 8D illustrates a perspective view of a portion of array blades.
Figure 8E:
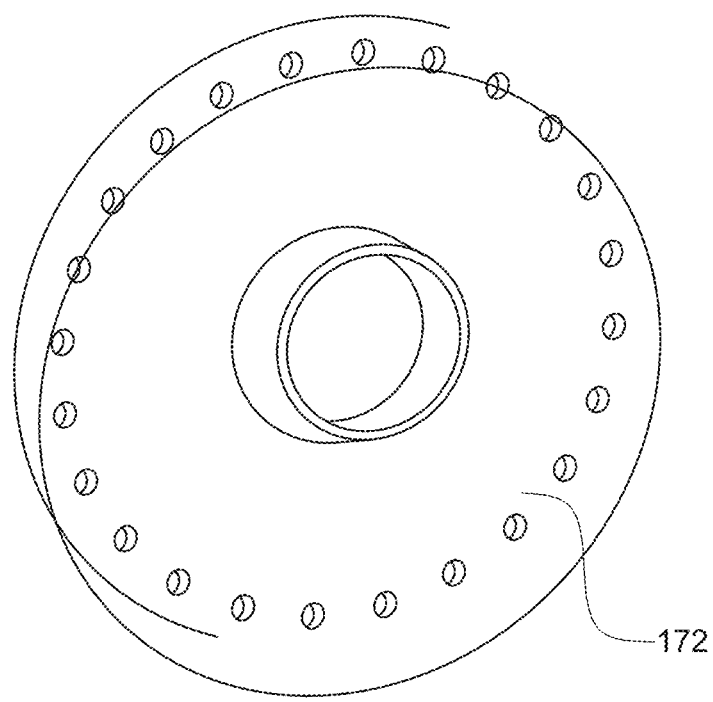
FIG. 8E illustrates a perspective view of a joint cap; and, FIG. 8F illustrates a perspective view of a step plate, according to one or more embodiments of the presently disclosed subject matter.
Figure 8F:
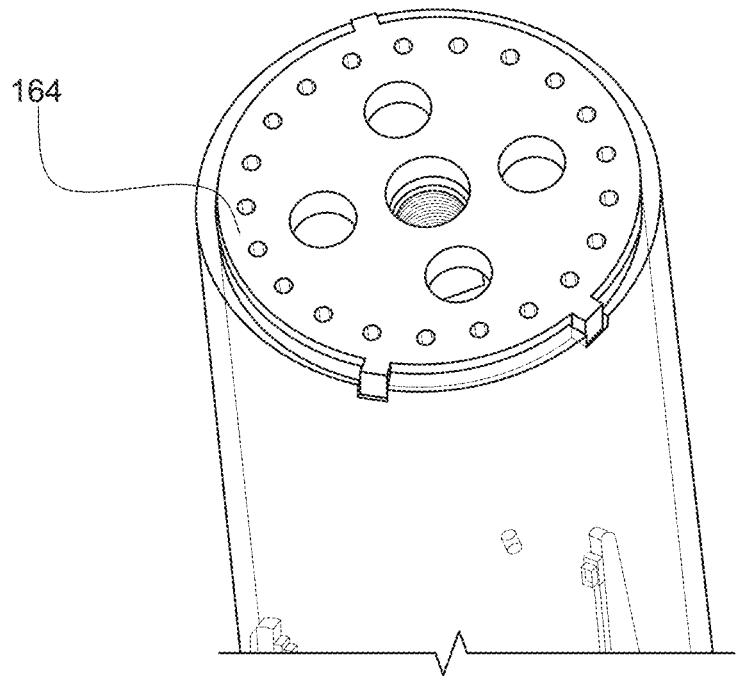

According to one or more embodiments, joint 214 further comprises a horizontal plate 86 carried within, and fixedly attached to, the hollow horizontal conduit. Horizontal plate 86 includes a plurality of horizontal plate openings arranged in a circle, each horizontal plate opening configured for receiving a vertical bolting mechanism 88 for adjustably coupling the horizontal plate to a stem plate 164 provided at an upper portion of the stem. The stem plate comprising a plurality of stem plate openings arranged in a circle. Each vertical bolting mechanism 88 passes through a horizontal plate opening and a corresponding stem plate opening to secure the joint to the stem. In various embodiments, solar array system 300 can further comprise a stem plate 164 as illustrated in FIG. 8F. In some embodiments, stem plate 164 can operate to couple the joint 214 to the stem of the solar array system.

In some embodiments, the plurality of joint cap openings total 12 or a multiple of 12. For example, in one embodiment, the plurality of joint cap openings can total 48. In some embodiments, array blade openings 84 and vertical plate openings 89 provided on joint cap 172 can have the same count as joint cap openings 82; in other embodiments, array blade openings 84 and the vertical plate openings 89 provided on joint cap 172 can have the different count as compared to joint cap openings 82. In one embodiment, joint cap openings can total 48 whereas the array blade openings 84 and the vertical plate openings 89 provided on joint cap 172 can total 24. This may provide for adjustments in 7.5-degree increments.

In various embodiments, solar array system 300 can further comprise a weather seal provided at the interface between the joint cap and the array blade. In some embodiments, each joint cap 172 further defines a plurality of extensions 94 extending therefrom. Each extension 94 may be configured for cooperatively fitting into a corresponding slit provided along a circumference of the horizontal conduit.

FIGS. 9A and 9B illustrate a solar array system 400. The primary difference of solar array system 400 from other solar array system 100 disclosed herein is that teeth of the conduit gear 146 are be positioned along an external circumference of the conduit gear 146 as compared with FIG. 3B wherein the teeth of the conduit gear 46 are be positioned along an internal circumference of the conduit gear 46.

According to various embodiments, internal/external plate gears and laser cut gears can be welded to relevant structural members. In some embodiments, the gears can be machined. Whereas embodiments of the presently disclosed subject matter describe a gear mechanism, in at least some embodiments, the gear mechanism in effect represents a spline connection wherein splines keep two parts in the same angular position.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device for securing an orientation of photovoltaic panels, comprising:
    a stem for supporting an array assembly of the photovoltaic panels for producing an electrical current when exposed to sunlight, the array assembly further comprising eye blades positioned on a side opposite to a photovoltaic panel carrying side; and
    a joint interconnecting the stem and the eye blades of the array assembly, wherein:
    the joint comprises a hollow horizontal conduit and a bolting mechanism for adjustably coupling the eye blades to lateral ends of the hollow horizontal conduit;
    the joint further comprises a vertical conduit coupled to the hollow horizontal conduit, and the vertical conduit carries a plate gear for cooperatively meshing with a stem gear carried at an upper portion of the stem; and
    a side of each eye blade facing the hollow horizontal conduit carries an eye blade gear that cooperatively meshes with a conduit gear carried at or near each lateral end of the hollow horizontal conduit to secure the array assembly at a predetermined angle relative to a longitudinal axis passing through the stem.

2. The device of claim 1, wherein a bottom portion of the vertical conduit circumferentially extends over a top portion of the stem.

3. The device of claim 2, further comprising at least one second bolt mechanism for securing the stem to the joint at a predetermined orientation of a major plane of the array assembly about the longitudinal axis passing through the stem.

4. The device of claim 3, wherein the second bolt mechanism intersects one or more of the plate gear and the stem gear at a substantial right angle.

5. A device for securing an orientation of photovoltaic panels, comprising:
    a stem for supporting an array assembly of the photovoltaic panels for producing an electrical current when exposed to sunlight, the array assembly further comprising eye blades positioned on a side opposite to a photovoltaic panel carrying side; and
    a joint interconnecting the stem and the eye blades of the array assembly, wherein:
    the joint comprises a hollow horizontal conduit and a bolting mechanism for adjustably coupling the eye blades to lateral ends of the hollow horizontal conduit;
    a side of each eye blade facing the hollow horizontal conduit carries an eye blade gear that cooperatively meshes with a conduit gear carried at or near a lateral end of the hollow horizontal conduit to secure the array assembly at a predetermined angle relative to a longitudinal axis passing through the stem; and
    each eye blade further comprises a tube guide for sliding over an end of the hollow horizontal conduit, the tube guide extending circumferentially over at least part of the lateral end of the hollow horizontal conduit.

6. The device of claim 1, wherein teeth of the conduit gear are positioned along an internal circumference of the conduit gear.

7. The device of claim 1, wherein teeth of the conduit gear are positioned along an external circumference of the conduit gear.

8. The device of claim 1, wherein the conduit gear comprises a gear formed on a plate, wherein the plate is attached to a lateral end of the hollow horizontal conduit.

9. The device of claim 8, wherein the plate is welded to the lateral end of the hollow horizontal conduit.

10. The device of claim 1, wherein each eye blade gear is welded or bolted to its associated eye blade.

11. The device of claim 1, wherein the hollow horizontal conduit further comprises access ports for accessing an interior of the hollow horizontal conduit.

* * * * *